United States Patent [19]
Stockberger

[11] 3,756,638
[45] Sept. 4, 1973

[54] KNOT TYER

[76] Inventor: Lamar A. Stockberger, 3505 Drumm, Independence, Mo. 64055

[22] Filed: Feb. 22, 1972

[21] Appl. No.: 227,876

[52] U.S. Cl. .............................................. 289/17
[51] Int. Cl. ...................................... D03j 3/00
[58] Field of Search ................................... 289/17

[56] References Cited
UNITED STATES PATENTS
2,498,920  2/1950  Holland .............................. 289/17
2,825,592  3/1958  Semple ............................... 289/17

*Primary Examiner*—Louis K. Rimrodt

[57] ABSTRACT

A knot tying tool having an elongated, resilient body provided with a pair of transverse inner slits and a pair of transverse outer slits is especially adapted for use in typing a blood or barrel knot for joining a plurality of fishing line leaders. The two inner slits which are disposed in a converging relationship each receive and retain a stretch of their respective leader such that during the process of tying the knot the leaders are withdrawn from the slits and come together as the knot is pulled tight. The free ends of the stretches have in the meantime, been retained in the two outer slits while the knot is being formed and are subsequently removed therefrom after the knot has been completed.

6 Claims, 6 Drawing Figures

PATENTED SEP 4 1973  3,756,638
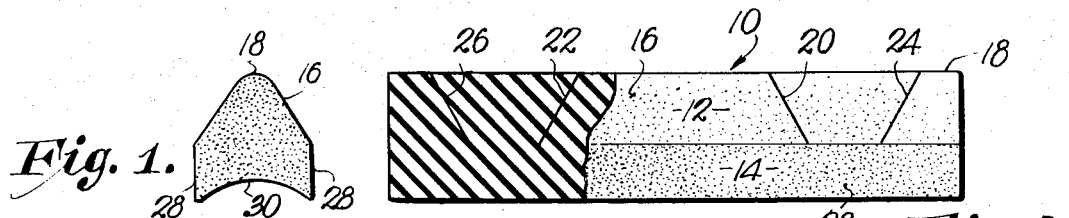
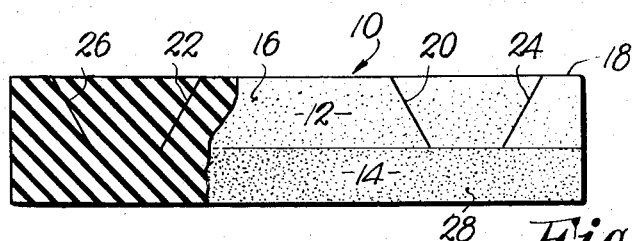
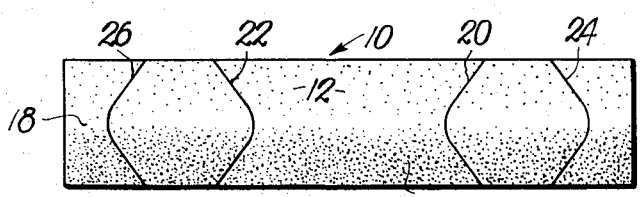
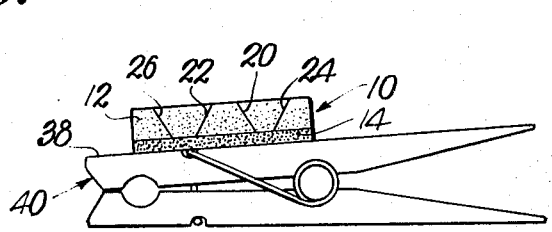
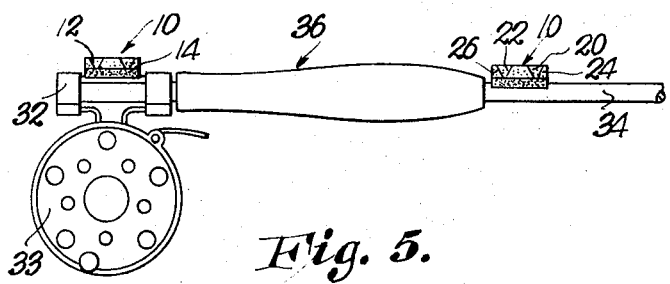
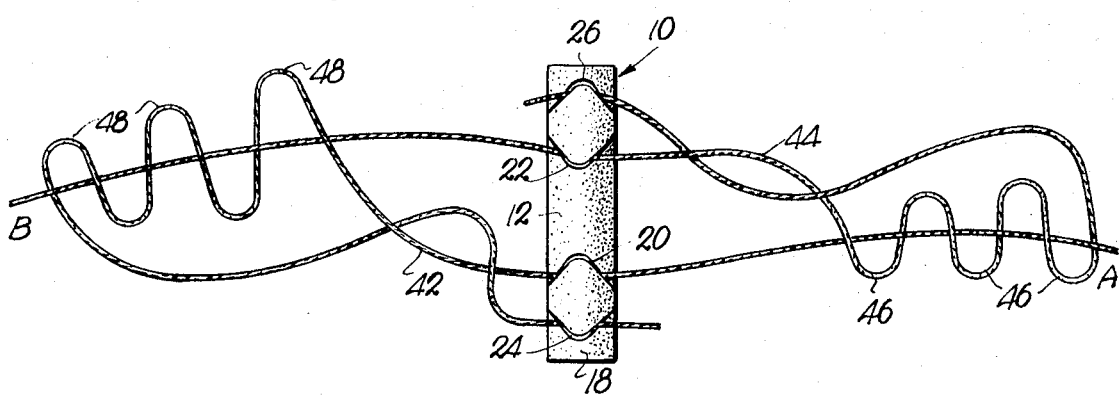

KNOT TYER

This invention relates to a knot tyer for facilitating the tying together of fishline leaders through use of a knot known commonly as a blood or barrel knot. One of the problems encountered by fly-fishermen is that of being able to quickly and easily tie leaders or tippets to a line while fishing, or in situations where the assistance of another person is not available for holding the leaders while the latter are being joined. The very nature of the leaders makes them hard to handle and to tie by reason of their generally slick, thin, and thread-like characteristics.

The difficulty of joining the leaders to one another can best be illustrated by calling attention to the problem a fisherman might have it he were out in midstream while fishing and his line became snagged or broken, making it necessary for him to add new leaders and a tippet to his line. Because of being unable to lay his fishing rod down he would have to retain it in some manner while tying a new series of leaders to the line. The knots are difficult to tie in the best of conditions and are next to impossible to tie if he has to manipulate the leaders to tie the knots while at the same time retaining control of the rod. Furthermore, if the knot tyer does not release the leaders at the proper time or correctly orient the same with respect to one another during the formation of the knot, a loose, insecure knot may result, causing failure thereof at a later time. This would be particularly true at times when tension is exerted on the line such as when landing a fish.

It is, therefore, a very important object of my invention to provide a knot tyer that automatically releases the leaders therefrom at the proper time, thereby insuring a secure and reliable knot.

Another very important object of the invention is to provide a blood or barrel knot tyer which enables the user to join a pair of leader lines without the assistance of another person.

Yet another important object is to provide a compact, lightweight, easy-to-use knot tyer that makes it possible for a user to join two leaders together without the need to rely on a burdensome, clumsy, and difficult-to-use complex device having a plurality of parts that are susceptible to misalignment or other adjustment difficulties.

It is another object of my invention to provide a knot tyer that may be conveniently, easily and permanently affixed to a fishing rod, a tackle box, or be supported by some readily available clamping device such as a clothespin.

Still another object of the invention is to provide a relatively inexpensive, yet durable knot tyer that is distinguished by its simplicity and ease of use.

In the drawing:

FIG. 1 is an end elevational view of a knot tyer made in accordance with my present invention;

FIG. 2 is a side elevational view of the knot tyer, a portion thereof shown in section;

FIG. 3 is a top plan view thereof;

FIG. 4 is a side elevational view showing the knot tyer affixed to a spring-type clothespin;

FIG. 5 is a fragmentary, side elevational view of a fishing rod having a knot tyer attached to the handle thereof, and a second knot tyer attached to the rod itself just ahead of the handle; and FIG. 6 is a diagrammatic, fragmentary plan view of a pair of leader lines held by a knot tyer and intertwined with one another in a manner to form a blood knot when tightened.

A knot tyer for joining a pair of fishing line leaders, here identified as a and B respectively, in a blood or barrel knot is in the nature of an elongated, resilient body, broadly designated by the numeral 10, having a generally triangular portion 12 and a base 14. The portion 12 is provided with an elongated, outer surface 16 having a longitudinal, transversely convex terminal apex 18, and is further provided with a pair of transverse inner slits 20 and 22 and a pair of transverse outer slits 24 and 26 spaced therealong. The slits 20–24 extend inwardly from the surface 16 through substantially the entire thickness of the portion 12, such that the inner slits 20 and 22 converge as the surface 16 is approached, and the slits 24 and 26 diverge as the surface 16 is approached.

The body 10 is made of a resilient material, the most ideal of which would be rubber having a hardness of 50–60 on a durometer scale and of a composition that would not have an adverse chemical reaction on the monofilament leaders A and B with which the tyer 10 comes into contact. The base 14 includes substantially straight sidewalls 28 and a transversely concave, longitudinal, inner wall 30 opposite to and parallel with the apex 18 of the portion 12. The concavity of the wall 30 of the base 14 is ideally suited for attachment to a handle 32 immediately above a reel 33 or to the rod 34 of a fishing pole 36 as seen in FIG. 5. While either of the two locations there illustrated are suggested positions for the tyer 10, the latter may be attached as by gluing, to any convenient portion of the pole 36, depending on the wishes of the user.

Whereas the configuration of the wall 30 of the base 14 is adapted for convenient attachment to the pole 36 as above mentioned, the tyer 10 is also easily attached, again as by gluing, to other supports such as to one of the flat, outer surfaces 38 of a conventional spring-type clothespin 40 as seen in FIG. 4. The clamping capability of the clothespin 40 enables the latter to function as a convenient and readily adaptable support or mounting for the tyer 10 so that it may be attached to a workbench, tackle box, board or any other relatively stable and convenient member, thus leaving the hands of the user free to tie the blood knot, the diagram of which is shown in FIG. 6.

In use, the leader A is placed in the slit 20 such that a stretch 42 extends about 6 inches beyond the tyer 10. The second leader B is then placed in the slit 22 from the opposite side of the tyer 10 such that a stretch 44 likewise extends beyond the tyer 10 for approximately 6 inches in the opposite direction of the stretch 42. The stretch 44 is then wrapped around the leader A three times, forming a set of loops 46, after which the end of the stretch 44 is passed back over the latter and thence thereunder to be placed in and retained by the slit 26. The stretch 42 of the leader A is then likewise wrapped about the leader B three times, also forming a set of loops 48, after which the end of the stretch 42 is passed under the latter and then looped thereover and placed in the slit 24. The leaders A and B have now been properly intertwined and the user has but merely to grasp the leaders A and B in each hand respectively and pull in opposite directions during which time the loops 46 and 48 will come together by virtue of the leaders A and B sliding through the respective slits 20 and 22. The inclination of the slits 20 and 22 causes the leaders A and B to approach one another as they are pulled taut and, at about the instant the leaders A and B are withdrawn from the slits 20 and 22 respectively, the loops 46 and 48 come together and are tightened to form a knot.

The converging angularity of the slits 20 and 22 permit the leaders A and B to follow their natural paths of movement toward one another as tension is exerted thereon, yet are capable of adequately gripping the leaders to enable the loops 46 and 48 to be pulled sufficiently close together before the leaders A and B are automatically released. It is important to the formation of a secure, slip-proof knot that the loops 46 and 48 come together just as the leaders A and B release from the slits 20 and 22. If the slits 20 and 22 were not in a converging relationship the leaders A and B would tend to pull out of the slits 20 and 22 prematurely and thus be released before the loops 46 and 48 were in a position to be properly tightened. Once the knot has been secured, continued pulling of the respective leaders A and B causes the ends thereof to pull out of the slits 24 and 26 after which the excess length of the stretches 42 and 44 are cut away adjacent the knot.

Having thus described the invention, what is claimed as new and desired to be secured by Letters Patent is:

1. A holder for use in joining a pair of filaments comprising: an elongated resilient body having a base adapted for attachment to a support and an upper portion which includes a pair of sides and a top surface, said upper portion being provided with a pair of transverse inner slits and a pair of transverse outer slits for receiving and retaining filaments to be joined, said slits extending inwardly from said top surface.

2. A knot tyer as claimed in claim 1 wherein said inner slits converge inwardly from said top surface and said outer slits diverge as said surface is approached.

3. A knot tyer as claimed in claim 1 wherein said upper portion is generally triangular in transverse cross-section, said top surface extending along said portion.

4. A knot tyer as claimed in claim 3 wherein said upper portion is provided with a longitudinal, transversely convex, terminal apex.

5. A knot tyer as claimed in claim 4 wherein said outer slits diverge as said surface is approached.

6. A knot tyer as claimed in claim 2 wherein said upper portion includes a pair of sides and an apex, said sides converging as the apex is approached.

* * * * *